United States Patent
Zhou et al.

(10) Patent No.: US 11,700,092 B2
(45) Date of Patent: Jul. 11, 2023

(54) APPARATUS AND METHOD FOR TRANSMITTING REFERENCE SIGNAL AND COMMUNICATION SYSTEM

(71) Applicant: FUJITSU LIMITED, Kawasaki (JP)

(72) Inventors: Hua Zhou, Beijing (CN); Wei Xi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/356,642

(22) Filed: Mar. 18, 2019

(65) Prior Publication Data
US 2019/0215123 A1 Jul. 11, 2019

Related U.S. Application Data

(63) Continuation of application No. PCT/CN2016/100805, filed on Sep. 29, 2016.

(51) Int. Cl.
*H04L 5/00* (2006.01)
*H04W 16/28* (2009.01)
(Continued)

(52) U.S. Cl.
CPC ............ *H04L 5/0048* (2013.01); *H04B 7/04* (2013.01); *H04L 5/0026* (2013.01);
(Continued)

(58) Field of Classification Search
CPC ... H04L 5/0048; H04L 5/0053; H04L 5/0082; H04L 5/0026; H04L 5/0092; H04B 7/04;
(Continued)

(56) References Cited

U.S. PATENT DOCUMENTS

2013/0114447 A1   5/2013   Luo et al.
2013/0237218 A1*  9/2013   Li .................... H04W 48/16
                                                    455/434
(Continued)

FOREIGN PATENT DOCUMENTS

CN    103686861 A    3/2014
CN    103812546 A    5/2014
(Continued)

OTHER PUBLICATIONS

International Search Report issued by the State Intellectual Property Office of the P.R. China for corresponding International Patent Application No. PCT/CN2016/100805, dated Jun. 9, 2017, with an English translation.

(Continued)

*Primary Examiner* — Peter P Chau
(74) *Attorney, Agent, or Firm* — Myers Wolin, LLC

(57) ABSTRACT

An apparatus and method for transmitting reference signal and a communication system. The method includes: transmitting first information on one or more beams formed by a plurality of antennas in beam sweeping duration, the first information at least comprising a synchronization channel, a first reference signal and a physical broadcast channel. Hence, a receiving device may demodulate the physical broadcast channel by using the first reference signal, thereby achieving design of beam reference signals in a beam sweeping system.

18 Claims, 9 Drawing Sheets

(51) Int. Cl.
*H04B 7/04* (2017.01)
*H04W 72/20* (2023.01)
*H04W 72/30* (2023.01)
*H04J 11/00* (2006.01)

(52) U.S. Cl.
CPC .......... *H04L 5/0053* (2013.01); *H04L 5/0082* (2013.01); *H04L 5/0092* (2013.01); *H04W 16/28* (2013.01); *H04W 72/20* (2023.01); *H04W 72/30* (2023.01); *H04J 11/0073* (2013.01); *H04J 11/0076* (2013.01)

(58) Field of Classification Search
CPC .. H04B 7/0695; H04W 72/005; H04W 16/28; H04W 72/0406; H04J 11/0073; H04J 11/0076

See application file for complete search history.

(56) References Cited

U.S. PATENT DOCUMENTS

| | | | | |
|---|---|---|---|---|
| 2014/0192768 | A1* | 7/2014 | Yeh | H04B 7/06 370/328 |
| 2015/0180631 | A1 | 6/2015 | Zhang | |
| 2015/0304991 | A1 | 10/2015 | Chen et al. | |
| 2016/0197659 | A1 | 7/2016 | Yu et al. | |
| 2016/0277225 | A1* | 9/2016 | Frenne | H04L 5/0048 |
| 2016/0337993 | A1 | 11/2016 | Takeda et al. | |
| 2017/0201980 | A1* | 7/2017 | Hakola | H04W 48/16 |
| 2017/0214505 | A1* | 7/2017 | Zhang | H04L 1/0041 |
| 2017/0311353 | A1* | 10/2017 | Liu | H04B 7/0695 |
| 2017/0332359 | A1* | 11/2017 | Tsai | H04B 7/0639 |
| 2017/0353256 | A1* | 12/2017 | Islam | H01Q 3/2605 |
| 2018/0063828 | A1* | 3/2018 | Wang | H04B 7/0456 |
| 2018/0138590 | A1* | 5/2018 | Uchida | H04B 7/0413 |
| 2018/0343043 | A1* | 11/2018 | Hakola | H04B 7/0417 |
| 2019/0373614 | A1* | 12/2019 | Yum | H04W 72/042 |
| 2020/0382265 | A1* | 12/2020 | Fukui | H04B 7/0632 |
| 2021/0211213 | A1* | 7/2021 | Islam | H04L 5/0023 |

FOREIGN PATENT DOCUMENTS

| | | |
|---|---|---|
| CN | 103959690 A | 7/2014 |
| CN | 104144468 A | 11/2014 |
| CN | 105453629 A | 3/2016 |
| CN | 105850196 A | 8/2016 |
| WO | 2014/019343 A1 | 2/2014 |
| WO | 2015/098456 A1 | 7/2015 |

OTHER PUBLICATIONS

Written Opinion of the International Searching Authority issued by the State Intellectual Property Office of the P.R. China for corresponding International Patent Application No. PCT/CN2016/100805, dated Jun. 9, 2017, with an English translation.
First Notification of Office Action and Search Report issued by the China National Intellectual Property Administration for corresponding Chinese Patent Application No. 201680088567.6, dated Jan. 2, 2020, with an English translation.
Second Notification of Office Action and Search Report issued by the China National Intellectual Property Administration for corresponding Chinese Patent Application No. 201680088567.6, dated Oct. 16, 2020, with a full English translation.
Third Notification of Office Action and Search Report by the China National Intellectual Property Administration for corresponding Chinese Patent Application No. 201680088567.6, dated Mar. 30, 2021, with an English translation.

* cited by examiner

APPARATUS AND METHOD FOR TRANSMITTING REFERENCE SIGNAL AND COMMUNICATION SYSTEM

CROSS REFERENCE TO RELATED APPLICATIONS

This application is a continuation application of International Application PCT/CN2016/100805 filed on Sep. 29, 2016, the entire contents of which are incorporated herein by reference.

TECHNICAL FIELD

This disclosure relates to the field of communication technologies, and in particular to an apparatus and method for transmitting a reference signal and a communication system.

BACKGROUND

Large-scale antennas have been used to enhance system coverage, eliminate interference between user equipments, reduce the number of sites, and lower the cost of operation and maintenance, which is one of the popular candidate technologies in current and future wireless communication systems. In recent years, three-dimensional (3D) beamforming techniques have been extensively studied due to development of the antenna technology and the advantage of lowering a size of an antenna array by using higher operating frequencies.

FIG. 1 is a schematic diagram of beamforming of a user equipment, in which a principle of using this technique is given. As shown in FIG. 1, by beam alignment of a transmitting device (such as a base station), a receiving device (such as a user equipment) is able to acquire a higher beamforming gain, thereby reducing interference between user equipments. Moreover, the system is able to support multi-user multi-antenna technology for more data streams, and spatially multiplex user equipments, thereby further increasing the system capacity.

In the existing advanced long-term evolution (LTE-A) Rel. 13 standard, such multi-antenna can be utilized to provide non-precoded antenna ports having a spatial dimension up to 16 ports. When locations of the user equipments considered in the antenna ports are unknown, multi-port reference signals are transmitted, so that the user equipment side performs channel measurement to feed back optimal antenna ports. In the LTE-A Rel.14 standard currently under discussion, the non-precoded antenna ports are being further extended to 32 ports.

How to use a plurality of beams has been under study.

FIG. 2 is a schematic diagram of a multi-antenna system employing beamforming. As shown in FIG. 2, a transmitting device (such as a base station) transmits a plurality of beams in different directions (such as beam 1 to beam 4 shown in FIG. 2) to different receiving devices (such as user equipments). Each beam may be in a fixed direction, or the beam directions may vary depending on the locations of the user equipments. Considering that transmission power of the transmitting device is limited, it is impractical to transmit a plurality of beams covering an entire cell at the same time. For this reason, the transmitting device may adopt a beam sweeping method, that is, beams in different directions are transmitted at different times, and the user equipment selects an appropriate beam as a path for data transmission based on strengths of the received beams.

And in the future, beamforming in analog domain and digital domain will also be used in large numbers.

FIG. 3 is a schematic diagram of a multi-antenna system employing analog beamforming and digital beamforming. As shown in FIG. 3, some antenna elements are connected to different transmission and reception units (TXRUs), and different TXRUs have independent phases and/or power adjustment to form different analog beams (which may have analog beam identifiers); and a plurality of TXRUs are connected to different antenna ports (APs), and different digital beams (which may have digital beam identifiers) may be formed by weighting in the digital domain.

When it is needed to cover a long distance, identical analog beam weighting may be used for a plurality of different TXRUs to form a beam covering a farther distance; of course, digital domain weighting may still be used to further form a finer digital beam.

On the other hand, there are many different downlink reference signals in current wireless communication standards (e.g. LTE-A Rel. 13 and earlier versions). For example, a cell-specific reference signal (CRS) is used for whole cell transmission, so as to assist the user equipment side to perform channel estimation, and hence is used for demodulation of various data channels or control channels.

Especially in synchronization by the user equipment, after a cell ID is obtained by the synchronization, CRS detection may be performed. The CRS uses the cell ID for sequence initialization and frequency resource position offset, then demodulation of a physical broadcast channel (PBCH) is performed based on the detected CRS to obtain a master information block (MIB), and physical downlink control channel (PDCCH) detection is performed to further obtain important system information (such as SIB1, and SIB2, etc.).

In addition to being used for PBCH detection and control/data channel detection, the CRS may also be used for radio resource management (RRM) measurement for mobility management of the user equipments, such as handover, etc.

In the existing standard, it is specified that the CRS is transmitted at a fixed position of each subframe, and an offset position of the frequency domain is associated with the cell ID. And the signal is a PN pseudo-random sequence and its status is initialized with the cell ID, which is shown by the following equation:

$$r_{l,n_s}(m) = \frac{1}{\sqrt{2}}(1-2\cdot c(2m)) + j\frac{1}{\sqrt{2}}(1-2\cdot c(2m+1)),$$

$$m=0, 1, \ldots, 2N_{RB}^{max,DL}-1;$$

where, $n_s$ is a slot index in a radio frame, and l is an orthogonal frequency division multiplexing (OFDM) symbol index in a slot.

$$c_{init}=2^{10}\cdot(7\cdot(n_s+1)+l+1)\cdot(2\cdot N_{ID}^{cell}+1)+2\cdot N_{ID}^{cell}+N_{CP};$$

where, $N_{ID}^{cell}$ is the cell ID.

In addition to the CRS, when the base station is configured with a plurality of antennas, a channel state information reference signal (CSI-RS) may further be configured. Different antenna ports may occupy different time-frequency resource positions, and a coverage range of the CSI-RS may be extended in an orthogonal cover code (OCC) manner.

Similar to the CRS, a pseudo-random sequence may be used for transmission of the CSI-RS, and state initialization may be performed with a cell ID or a CSI ID. The CSI-RS may be used for short-term channel measurement at the user equipment side to feed back short-term channel states, so that the base station may perform scheduling of the user equipment data channels by using an optimal antenna port. In addition, since the CSI-RS is only used for channel measurement, the base station may configure its transmission period and time-frequency resource location as needed.

In addition, in order to assist the user equipment side in performing data detection, a UE-specific demodulation reference signal (DMRS) is further designed in an LTE-A system. Similar to the CRS, the DMRS is also modulated by using a pseudo-random sequence, with a difference that the sequence initialization of the DMRS is related not only to the cell ID of the user equipment, but also to a cell radio network temporary identifier (C-RNTI) of the user equipment, even to whether it is single-user multiple input multiple output (MIMO) or multi-user MIMO. The DM-RS is transmitted from the base station only when there exists user equipment data channel transmission, to be used in demodulating a physical downlink shared channel (PDSCH) in the same subframe of the user equipment.

FIG. 4 is a schematic diagram of reference signals in LTE-A Rel. 13, in which time-frequency resource locations of a CRS, a CSI-RS, and a DMRS in a subframe are shown. As can be seen from FIG. 4, all of these reference signals are spread on resource elements (REs) of different symbols in the sub-frame, rather than concentrated in one or more symbols therein. A reason for such a design is that a length of one subframe being 1 ms is taken into account, and in order to ensure channel estimation quality, positions of a plurality of reference signals are dispersed into a plurality of symbols, rather than concentrated in one symbol.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in a multi-antenna system using beamforming, for example, in a subframe, beams need to be sequentially changed with respect to directions, resulting in that a subframe structure is different from that in a conventional LTE-A system. For this reason, how to design one or more beam reference signals in a beam sweeping system is very important, and there is no technical solution concerning a beam reference signal at present.

Embodiments of this disclosure provide an apparatus and method for transmitting a reference signal and a communication system, in which one or more beam reference signals in a beam sweeping system is designed.

According to a first aspect of the embodiments of this disclosure, there is provided a method for transmitting a reference signal, applicable to a transmitting device, the method including:

transmitting first information on one or more beams formed by a plurality of antennas in beam sweeping duration, the first information at least including a synchronization channel, a first reference signal and a physical broadcast channel.

According to a second aspect of the embodiments of this disclosure, there is provided an apparatus for transmitting a reference signal, configured in a transmitting device, the apparatus including:

a transmitting unit configured to transmit first information on one or more beams formed by a plurality of antennas in beam sweeping duration, the first information at least including a synchronization channel, a first reference signal and a physical broadcast channel.

According to a third aspect of the embodiments of this disclosure, there is provided a method for transmitting a reference signal, applicable a receiving device, the method including:

receiving first information on one or more beams in beam sweeping duration, the first information at least including a synchronization channel, a first reference signal and a physical broadcast channel.

According to a fourth aspect of the embodiments of this disclosure, there is provided an apparatus for transmitting a reference signal, configured in a receiving device, the apparatus including:

a receiving unit configured to receive first information on one or more beams in beam sweeping duration, the first information at least including a synchronization channel, a first reference signal and a physical broadcast channel.

According to a fifth aspect of the embodiments of this disclosure, there is provided a communication system, including:

a transmitting device configured with the apparatus for transmitting a reference signal as described in the second aspect; and a receiving device configured with the apparatus for transmitting a reference signal as described in the fourth aspect.

An advantage of the embodiments of this disclosure exists in that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In this disclosure, a base station may be referred to as an access point, a broadcast transmitter, a transmission/reception point (TRP), a node B, an evolved node B (eNB), or a remote radio head/unit (RRH/RRU), etc., and may include some or all functions thereof. A term "base station" shall be used in the text, and each base station provides communication coverage for a specific geographical region. A term "cell" may refer to a base station and/or its coverage region, depending on a context where the term is used. Hereinafter, a base station may include a serving base station and/or coordination base station.

In this disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a machine-type communication device, a lap-top computer, and a cordless telephone, etc.

When a system uses a plurality of beams for signal coverage, only a relatively small number of beams can be used to perform signal coverage in a direction at each moment, and then the beams are shifted to the next direction by adjusting weighting vectors of analog beams and/or digital beams.

Figure 1:
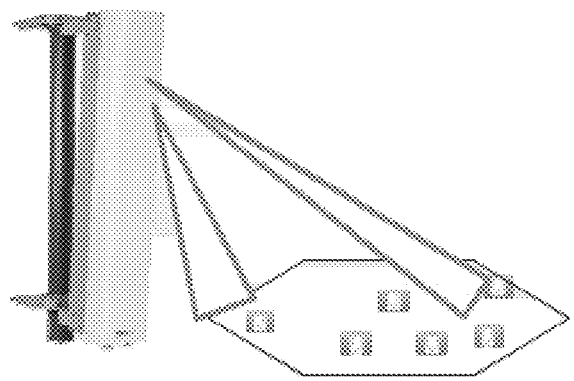
FIG. 1 is a schematic diagram of beamforming of a user equipment.
Figure 2:
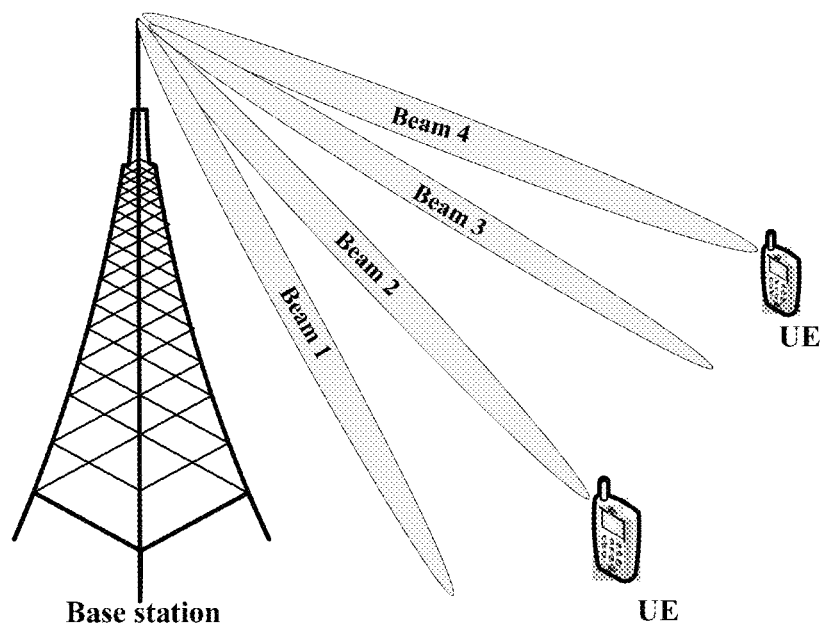
FIG. 2 is a schematic diagram of a multi-antenna system employing beamforming.
Figure 3:
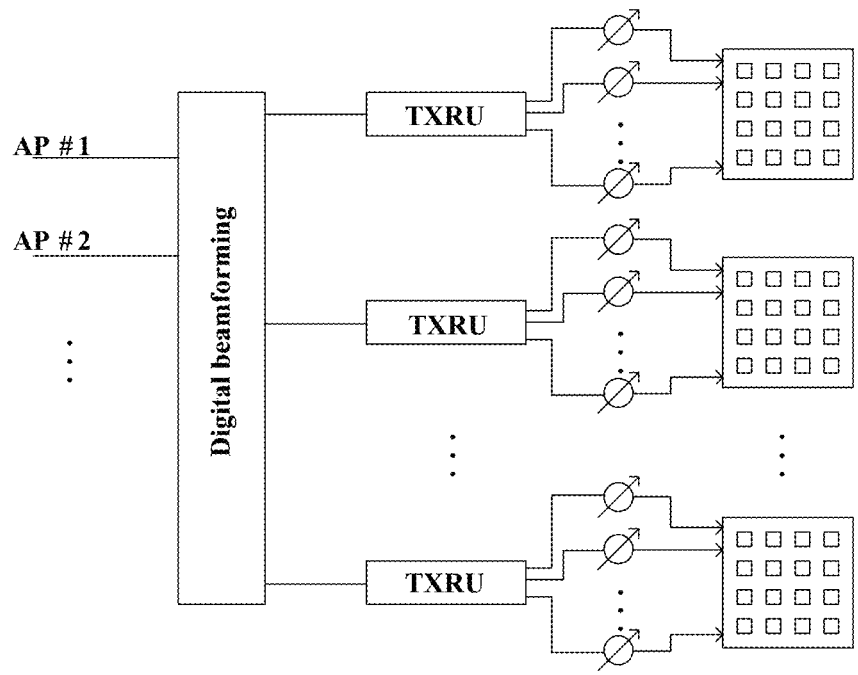
FIG. 3 is a schematic diagram of a multi-antenna system employing analog beamforming and digital beamforming.
Figure 4:
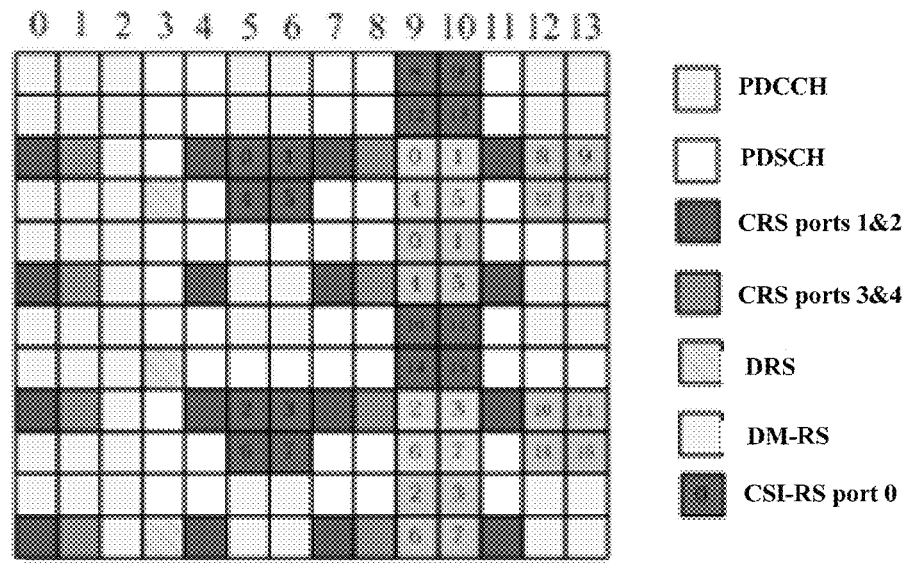
FIG. 4 is a schematic diagram of transmission of reference signals in a long-term evolution system.
Figure 5:
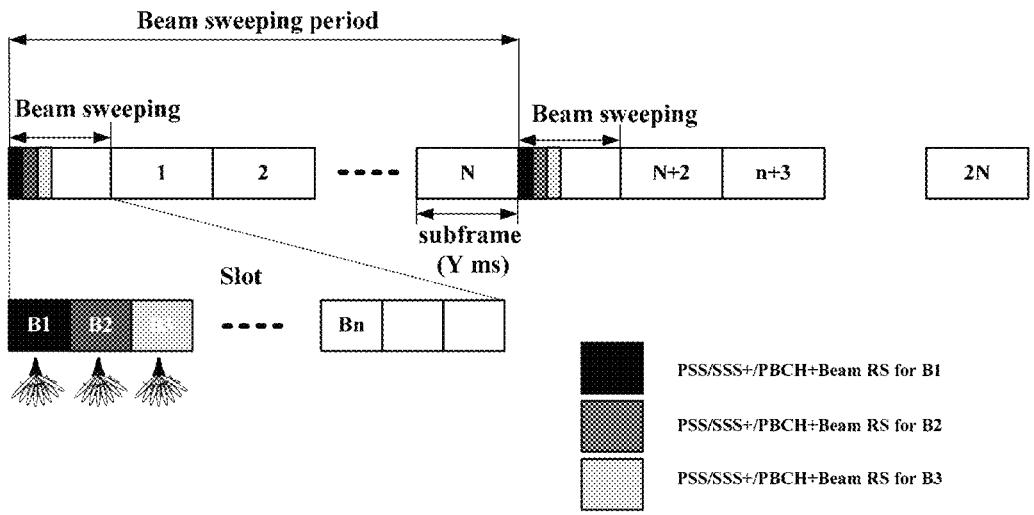
FIG. 5 is a schematic diagram of beam sweeping of a symbol level of an embodiment of this disclosure.

FIG. 5 is a schematic diagram of beam sweeping of a symbol level of an embodiment of this disclosure, in which an example of performing beam sweeping at a symbol level is given; that is, beam transmission in different directions is performed sequentially in different symbols of a subframe. Of course, beam transmission in different directions may also be performed in different subframes, which may be referred to as beam sweeping at a subframe level. Following description shall be given by taking beam sweeping at a symbol level as an example.

As shown in FIG. 5, in order to ensure downlink synchronization of a user equipment in different beam directions, it is needed that a synchronization channel (similar to a primary synchronization signal (PSS)/a secondary synchronization signal (SSS) in an LTE-A system; however, this disclosure is not limited thereto), a broadcast channel (similar to a PBCH an LTE-A system; however, this disclosure is not limited thereto), and other important system information, such as SIB1/2 and/or other SIB information, may be transmitted when the beams are turned to a certain direction (or angle).

In addition, in order to accurately demodulate the PBCH and the system information, it is also needed to transmit one or more reference signals. As synchronization channels and PBCHs in different beam directions are different and reference signals in different beam directions are also different, for the sake of simplicity, the reference signals transmitted in different beam directions are referred to as beam reference signals in the embodiments of this disclosure.

As can be seen from FIG. 5, since the beams in a subframe need to change direction sequentially, it is resulted in that a structure of the subframe is different from that of a subframe in a conventional single-beam LTE-A system. Therefore, how to design beam reference signals in a beam sweeping system becomes very important.

The reference signal in beam sweeping duration (such as a subframe in which beam sweeping is performed; however, this disclosure is not limited thereto) may be used for channel demodulation or channel measurement. In addition, after the end of the beam sweeping period, a base station performs normal data transmission in subsequent subframes (the duration to which the subframes correspond in the embodiment of this disclosure is referred to as non-beam-sweeping duration; however, this disclosure is not limited thereto), and at this case, the beam reference signal may be used for channel estimation and beam tracking of user equipment. Obviously, the reference signal in the non-beam-sweeping duration will be different from the reference signal in the beam sweeping duration.

Following description shall be given by taking a base station in a communication system as a transmitting device and a user equipment as a receiving device as an example. However, this disclosure is not limited thereto; for example, the transmitting device and/or the receiving device may also be other network devices. In this disclosure, various time units shall be described by taking frames, subframes, symbols, and slots, etc. as examples, which may be concepts similar to those in LTE-A; however, this disclosure is not limited thereto; for example, the time units may also be redefined. And furthermore, various signals or channels in this disclosure, such as a PSS, an SSS, and a PBCH, etc., may be concepts similar to those in LTE-A. However, this disclosure is not limited thereto; for example, the signals or channels may also be redefined.

Embodiment 1

These embodiments of this disclosure provide a method for transmitting a reference signal, which shall be described from a transmitting device of a communication system.

Figure 6:
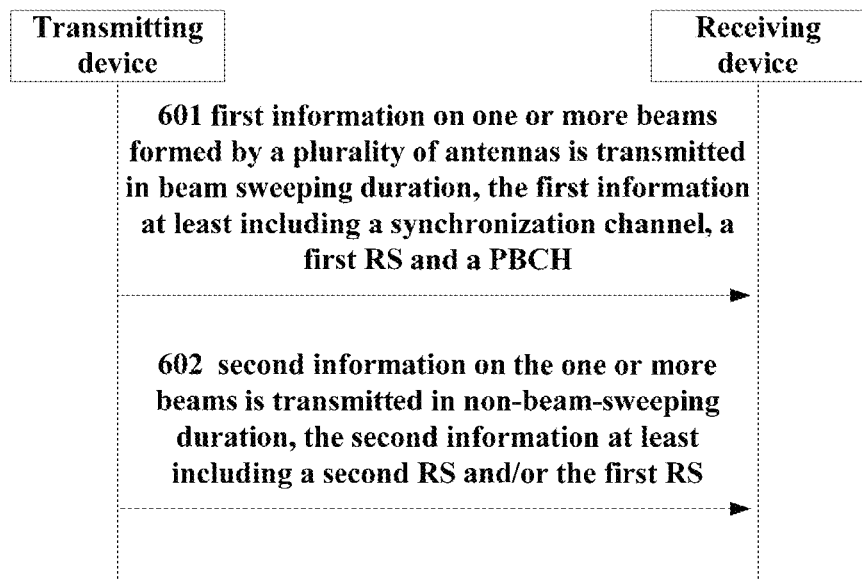
FIG. 6 is a flowchart of the method for transmitting a reference signal of Embodiment 1 of this disclosure.

FIG. 6 is a flowchart of the method for transmitting a reference signal of the embodiment of this disclosure. As shown in FIG. 6, the method for transmitting a reference signal includes:

Block 601: a transmitting device transmits first information on (or by, via) one or more beams formed by a plurality of antennas in beam sweeping duration, the first information at least including a synchronization channel, a first reference signal and a physical broadcast channel.

In an embodiment, the transmitting device may be a macro base station (such as an eNB), and a receiving device may be a user equipment; and the user equipment may be served by a macro cell generated by the macro base station; or the transmitting device may be a pico base station, and the receiving device may be a user equipment, or may be any device capable of receiving a signal from the base station; and the user equipment may be served by a pico cell (or a small cell) generated by the pico base station. Or, the transmitting device and/or the receiving device may be other network devices. However, this disclosure is not limited thereto, and a particular scenario may be determined according to an actual situation.

In an embodiment, the transmitting device may also be a coordination transmitter jointly constituted by a plurality of base stations. Here, each base station may have a relatively small number of antennas, and the plurality of base stations jointed for transmission may use relatively large number of antennas, thereby forming a plurality of beams in different directions.

Following description shall be given by taking a macro base station as an example; however, the embodiment of this disclosure may also be applicable to a scenario of coordinated transmission by a plurality of base stations.

As shown in FIG. 6, the method for transmitting a reference signal may further include:

Block 602: the transmitting device transmits second information on the one or more beams in non-beam-sweeping duration, the second information at least including a second reference signal and/or the first reference signal.

Contents in the period of beam sweeping shall be described below, and reference may be made to Embodiment 2 for contents in the non-beam-sweeping duration.

In an embodiment, the transmitting device may perform the beam sweeping periodically, and transmit the first information sequentially in each beam in the duration of each time of beam sweeping. For example, if the period of beam sweeping is 10 ms, the beam sweeping may be performed at an 0th, 10th, 20th, . . . subframes (the subframes here may be concepts similar to those in the LTE-A; however, this disclosure is not limited thereto, and other definitions are not excluded). The 0th, 10th, 20th, . . . subframes may be referred to as beam sweeping subframes, and other subframes may be referred to as non-beam-sweeping subframes; however, this disclosure is not limited thereto.

In an embodiment, the first information may further include: a control channel and/or data channel used for transmitting system parameters (such as relatively important system parameters). However, this disclosure is not limited thereto, and other signals or channels may be included as demanded.

Figure 7:
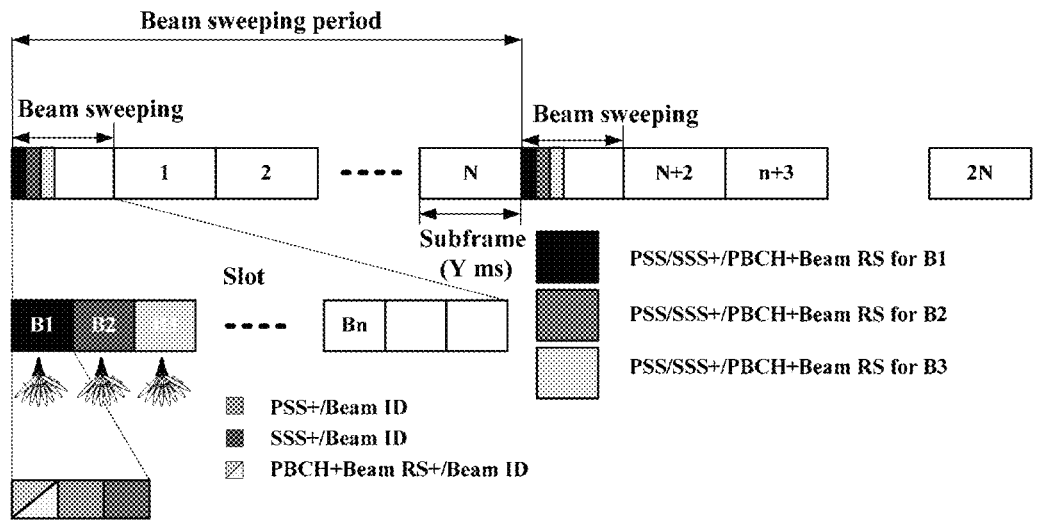
FIG. 7 is a schematic diagram of transmitting signals and channels on different beams in beam sweeping duration of Embodiment 1 of this disclosure.

FIG. 7 is a schematic diagram of transmitting signals and channels on different beams in beam sweeping duration of the embodiment of this disclosure. As shown in FIG. 7, considering that the user equipment does not need to perform downlink synchronization at every moment, beam sweeping may be performed on the beams at a certain period. For the sake of simplicity, only a PSS/SSS (i.e. a synchronization channel), a PBCH, and a beam reference signal (a beam RS, which is the first reference signal here), are shown in FIG. 7; each signal or channel may explicitly or implicitly contain a beam identifiers (beam ID); however, this disclosure is not limited thereto.

For example, after performing a time of omnidirectional (or needed directional) beam sweeping, the base station may perform a next time of beam sweeping after an N-th subframe. In the duration of one time of beam sweeping, it is needed to sequentially transmit associated control channels and data channels of the synchronization channel, the broadcast channel, the beam reference signal and other important system parameters in the beams in the needed direction, so as to ensure that users in different directions have opportunities to perform demodulation and decoding on these signals or channels.

In an embodiment, the first reference signal may be multiplexed with the physical broadcast channel.

In one embodiment, the first reference signal and the physical broadcast channel may be multiplexed in frequency domain.

For example, the first reference signal may be preset to be performed frequency multiplexing with the physical broadcast channel on the same symbol. In particular, a granularity of the frequency multiplexing may be a subcarrier (similar to an RE in an LTE-A system), or may be a physical resource block (similar to an RB in an LTE-A system).

Figure 8:
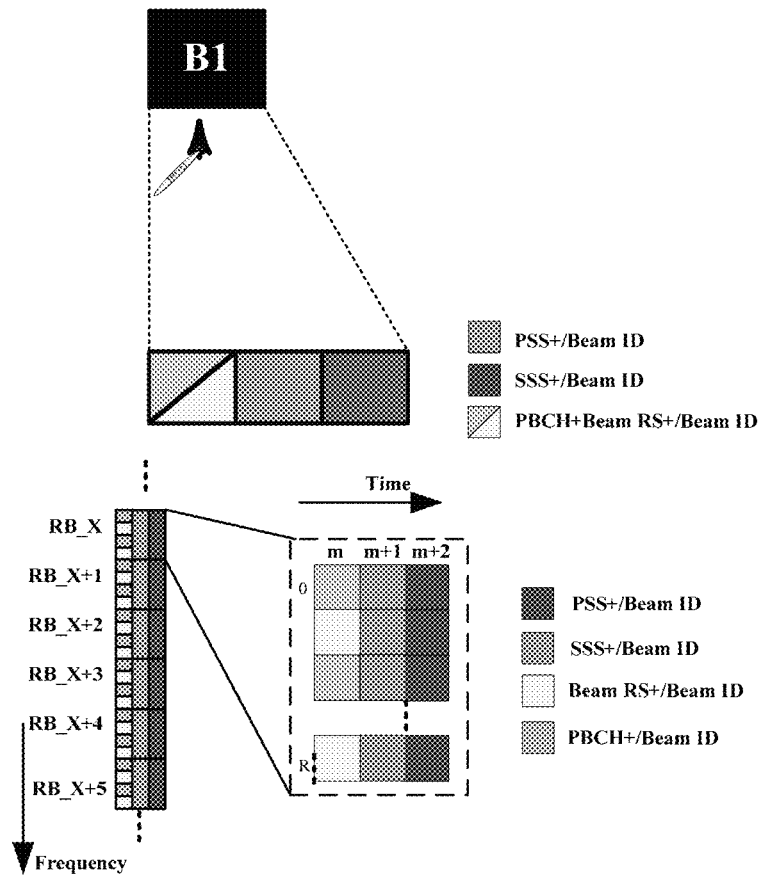
FIG. 8 is a schematic diagram of performing frequency multiplexing by a first reference signal and a physical broadcast channel of Embodiment 1 of this disclosure.

FIG. 8 is a schematic diagram of performing frequency multiplexing by a first reference signal and a physical broadcast channel of the embodiment of this disclosure, in which a manner of frequency multiplexing of a beam reference signal and a physical broadcast channel with a subcarrier as a granularity is given. Here, the beam reference signal and the physical broadcast channel respectively occupy different subcarriers of the same symbol sequentially.

For example, the physical broadcast channel occupies an odd-numbered subcarrier, and the beam reference signal occupies an even-numbered subcarrier. However, this disclosure is not limited thereto, and the base station may predefine an occupation method, so that the two types of signals use different subcarriers.

In addition, the frequency multiplexing method may also be extended, such as extending the granularity to two or more subcarriers. For example, when the granularity is 2 subcarriers, the beam reference signal occupies a 0th, 3rd, 6th, 9th, 12th subcarriers, and the physical broadcast channel occupies a 1st, 2nd, 4th, 5th, 7th, 8th, 10th, 11th subcarriers, etc.

Figure 9:
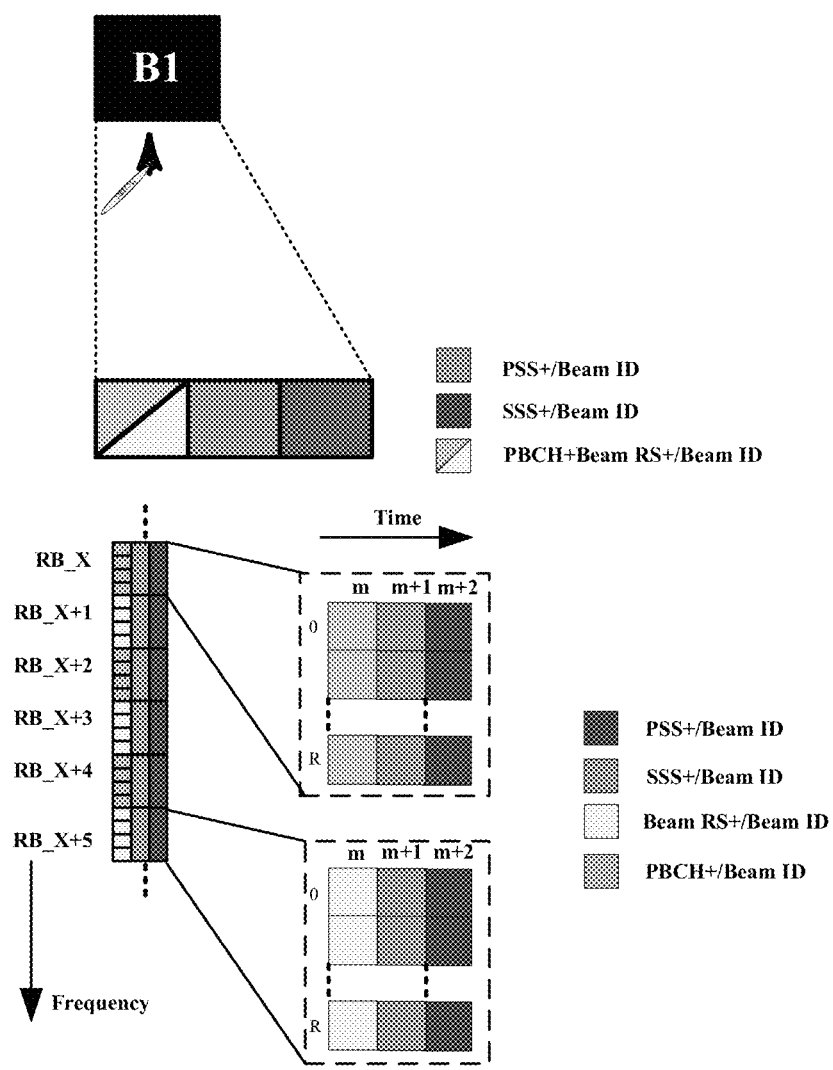
FIG. 9 is another schematic diagram of performing frequency multiplexing by a first reference signal and a physical broadcast channel of Embodiment 1 of this disclosure.

FIG. 9 is another schematic diagram of performing frequency multiplexing by a first reference signal and a physical broadcast channel of the embodiment of this disclosure, in which a manner of frequency multiplexing of a beam reference signal and a physical broadcast channel with an RB as a minimum granularity is given. Here, the two types of signals respectively occupy different RBs (which may be concepts similar to those in the LTE-A, and may be a fixed number of consecutive subcarriers) of the same symbol.

For example, the physical broadcast channel occupies an odd-numbered RB, and the beam reference signal occupies an even-numbered RB. However, this disclosure is not limited thereto, and the base station may predefine an occupation method, so that the two types of signals use different RBs.

In addition, the frequency multiplexing method may also be extended, such as extending the granularity into two or more RBs. For example, when the granularity is 2 RBs, the beam reference signal occupies a 0th, 3rd, 6th, 9th, 12th RBs, and the physical broadcast channel occupies a 1st, 2nd, 4th, 5th, 7th, 8th, 10th, 11th RBs, etc.

In an embodiment, the use of the frequency division multiplexing method may speed up the synchronization at the user equipment (or may be referred to as a terminal) side, as the beam reference signal and the physical broadcast channel are transmitted on one symbol, and the user equipment may perform channel estimation without needing to wait until all subframe data are received, thereby speeding up the synchronization process. However, the premise of frequency multiplexing is that the user equipment side may perform physical broadcast channel demodulation of a wideband, since the physical broadcast channel in the LTE-A system occupies 6 RBs in the center of the system. Hence, user equipments with different bandwidth capabilities may perform synchronization by only needing to detect signals on these 6 RBs.

In another embodiment, the first reference signal and the physical broadcast channel may be multiplexed in time domain, so as to solve a problem of, for example, synchronization a narrowband user equipment. For example, the first reference signal may be preset to perform time division multiplexing on different symbols from the physical broadcast channel.

Figure 10:
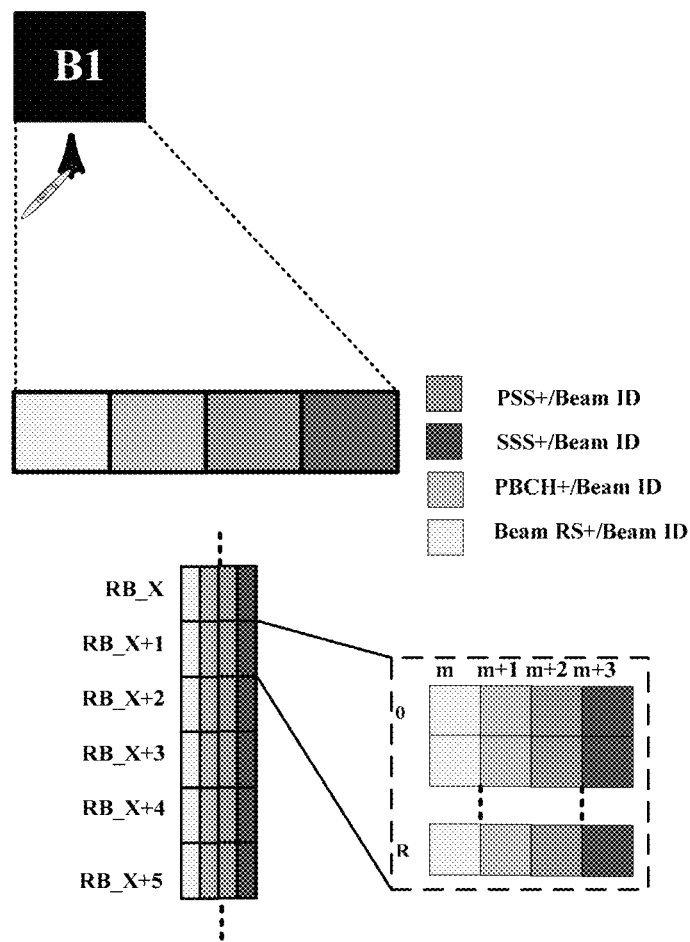
FIG. 10 is a schematic diagram of performing time domain multiplexing by a first reference signal and a physical broadcast channel of Embodiment 1 of this disclosure.

FIG. 10 is a schematic diagram of performing time domain multiplexing by a first reference signal and a physical broadcast channel of the embodiment of this disclosure. As shown in FIG. 10, the beam reference signal and the physical broadcast signal occupy different symbols.

It is should be noted that positions of the symbols occupied by the beam reference signal and the physical broadcast channel are illustrative only, and use of these symbols may be predefined by the base station. For example, within a beam transmission time period, the first symbol is occupied by the beam reference signal, a next symbol is occupied by the broadcast channel, and a subsequent symbol is occupied by the synchronization channel; however, this disclosure is not limited thereto.

In another embodiment, the first reference signal and the physical broadcast channel may be multiplexed in frequency domain and time domain; that is, the first reference signal may also be preset to perform two-dimensional multiplexing of time domain and frequency domain with the physical broadcast channel. For example, the beam reference signal may be transmitted on different subcarriers on two consecutive symbols, and the physical broadcast channel may also be transmitted on the two symbols, but occupies subcarriers different from that occupied by the beam reference signal, thereby achieving multiplexing on time domain and frequency domain.

The above is described schematically by taking multiplexing the first reference signal with the physical broadcast channel as an example; however, this disclosure is not limited thereto. And furthermore, the first reference signal may also be multiplexed with other signals or channels.

For example, the first reference signal may be multiplexed with the above-described control channel and/or data channel in frequency domain (with a granularity of a subcarrier, or a granularity of a resource block, and this disclosure is not limited thereto); or, first reference signal may be multiplexed with the control channel and/or the data channel in time domain; or the first reference signal and the control channel and/or data channel may be multiplexed in frequency domain and time domain.

In an embodiment, the transmission period of the first reference signal may be predefined by the base station. The transmission period of the first reference signal may be identical to the period of the beam sweeping, that is, the first reference signal may be transmitted only in the beam sweeping duration. In the first information transmitted in the beam sweeping duration, the first reference signal may be transmitted for all or part of the beams.

For example, supposing that the period of beam sweeping is 10 ms and the total number of beams is 10, the transmission period of the first reference signal (beam reference signal) is identical to the period of the beam sweeping, which is also 10 ms. That is, in the 0th subframe, the base station sequentially transmits the beam reference signals to different 10 beam directions on different symbols, in the 10th subframe, the base station sequentially transmits the beam reference signals to different 10 beam directions on different symbols, and so on.

Furthermore, the transmission period of the first reference signal may also be different from the period of the beam sweeping. For example, the first reference signal may be transmitted not only in the beam sweeping duration but also in the non-beam-sweeping duration. In the second information transmitted in the non-beam-sweeping duration, the first reference signal may be transmitted for all beams, or the first reference signal may be transmitted for part of beams.

For example, if the base station desires to speed up the transmission of the beam reference signal (first reference signal), the transmission period of the first reference signal may be preset to 5 ms, that is, the beam reference signal is transmitted once every 5 ms. On a subframe in beam sweeping duration (such as the 0th subframe), the base station transmits beam reference signals of all the 10 beams, and then transmits the beam reference signals of the 10 beams again on a 5th subframe (in non-beam-sweeping duration).

Of course, in order to reduce overhead of the beam reference signals, the beam reference signals of part of the beams may also be transmitted each time. For example, beam reference signals of all the 10 beams are transmitted on a subframe in beam sweeping duration (such as the 0th subframe), beam reference signals of {0, 2, 4, 6, 8} beams are transmitted at a next beam reference signal period (such as the 5th subframe, in non-beam-sweeping duration), and beam reference signals of {1, 3, 5, 7, 9} beams are transmitted at a further next beam reference signal period, and so on. Which beam reference signals are transmitted each time may be pre-designated by the base station.

Figure 11:
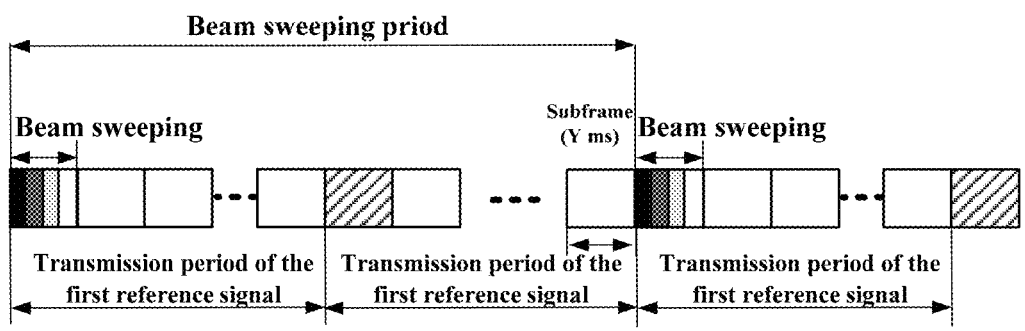
FIG. 11 is a schematic diagram of a beam sweeping period and a transmission period of a first reference signal of Embodiment 1 of this disclosure.

FIG. 11 is a schematic diagram of a beam sweeping period and a transmission period of a first reference signal of the embodiment of this disclosure, in which a case where a first reference signal period is less than a beam sweeping period is shown. Here, the subframes occupied by the beam reference signals are those represented by the shades, and reference signals of all the beams may be sequentially transmitted, or part of the beam reference signals may be transmitted, on the subframes.

In an embodiment, the first reference signal may be transmitted by using a pseudo-random sequence, the pseudo-random sequence being initialized by using a beam identifier. For example, the first reference signal may be generated by an equation as below:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1;$$

where, $n_s$ is a slot index in a radio frame, and l is an OFDM symbol index on a slot. $c_{init} = 2^{10} \cdot (7 \cdot (n_s+1)+l+1) \cdot (2 \cdot N_{ID}^{beam}+1)+2 \cdot N_{ID}^{beam}+N_{CP}$; where, $N_{ID}^{beam}$ is a beam ID, which may implicitly contain a cell ID.

That is, the pseudo-random sequence used for transmitting the first reference signal may be initialized based on the beam ID, or may be initialized based on the beam ID and the cell ID. It should be noted that only a particular implementation of the first reference signal is illustrated above; however, this disclosure is not limited thereto.

In an embodiment, the first reference signal may be used for one or more types of the following processing: demodulation of a physical broadcast channel, demodulation of a physical control channel and/or data channel used for transmitting important system parameters, and channel measurement related to beam switch; however, this disclosure is not limited thereto.

It can be seen from the above embodiments that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

Embodiment 2

The beam reference signal shall be further described in these embodiments on the basis of Embodiment 1. The first reference signal transmitted in the beam sweeping duration is illustrated in Embodiment 1. As described in Embodiment 1, the first reference signal may also be transmitted in the non-beam-sweeping duration. And furthermore, in the non-beam-sweeping duration, the transmitting device may transmit the second reference signal; both the first reference signal and the second reference signal may be referred to as beam reference signals.

The first reference signal and/or the second reference signal in the non-beam-sweeping duration shall be described in these embodiments, with contents identical to those in Embodiment 1 being not going to be described herein any further.

In an embodiment, in the non-beam-sweeping duration, the transmitting device transmits the second information on one or more beams, the second information at least including a second reference signal and/or the first reference signal.

In an embodiment, in the non-beam-sweeping duration, the second reference signal may be configured as the only reference signal. At this case, the second reference signal may be identical to the first reference signal, such as a transmission sequence, positions of time-frequency resources occupied in a subframe, and a transmission period, etc. Or, a part of the parameters may be identical, and some are different.

In an embodiment, the first reference signal in the second information may be transmitted on all the beams, or the first reference signal in the second information may be transmitted for part of the beams. The second reference signal in the second information may be transmitted on all the beams, or the second reference signal in the second information may be transmitted on part of the beams.

In an embodiment, the first reference signal and the second reference signal may be multiplexed in frequency domain, or the first reference signal and the second reference signal may be multiplexed in time domain, or the first reference signal and the second reference signal may be multiplexed in frequency domain and time domain.

And furthermore, when a current subframe is a non-beam-sweeping subframe, i.e. the current subframe does not transmit the synchronization channel and/or the broadcast channel, the first reference signal or the second reference signal may further be performed frequency multiplexing with other physical channels (such as a physical control channel, a physical data channel, a second type of broadcast channels (if any, which are different from the first type of broadcast channels in beam sweeping duration), and other types of reference signals, etc.), with a multiplexing granularity being subcarriers or physical resources blocks, etc. Alternatively, the first reference signal or the second reference signal may also be performed time multiplexing with other physical channels. Alternatively, the first reference signal or the second reference signal may also be performed two-dimensional multiplexing of time and frequency with other physical channels. Moreover, on remaining symbols (e.g., OFDM symbols) of the current subframe, the control channel and the data channel on respective beams may be transmitted.

In an embodiment, the transmitting device (such as the base station) may further configure the second reference signal on the non-beam-sweeping subframe, and the configuration of the second reference signal may be indicated via RRC (radio resource control) signaling or dynamic signaling. And the configuration of the second reference signal may include: a period of the beam reference signal, a duration, a time-frequency resource position, and an antenna port configuration, etc.

In an embodiment, one or more sets of second reference signals may be configured. For example, one or more sets of second beam reference signals may be configured for each beam via common control signaling (which may be, for example, transmitted via important system information in beam sweeping duration of the base station, and may be demodulated by using the first reference signal).

When a single set of second reference signals are configured, the user equipment may, for example, obtain such information as a time-frequency resource position of the second reference signal and antenna port configuration on the beam (via the common control signaling), thereby performing channel measurement/feedback by using the second reference signal, and performing demodulation of a PDCCH, or demodulation of a PDSCH, etc.

When a plurality of sets of second beam reference signals are configured, the user equipment may, for example, obtain such information as a time-frequency resource position of the second reference signal and antenna port configuration, etc., from the control channel/data channel (which are demodulated by using the first reference signal) transmitted on the beam sweeping subframe and the control channel/data channel (which are demodulated by using the first reference signal) transmitted on the non-beam-sweeping subframe and containing the first reference signal, thereby performing channel measurement/feedback by using the second reference signal, and performing demodulation of a PDCCH, or demodulation of a PDSCH, etc.

Figure 12:
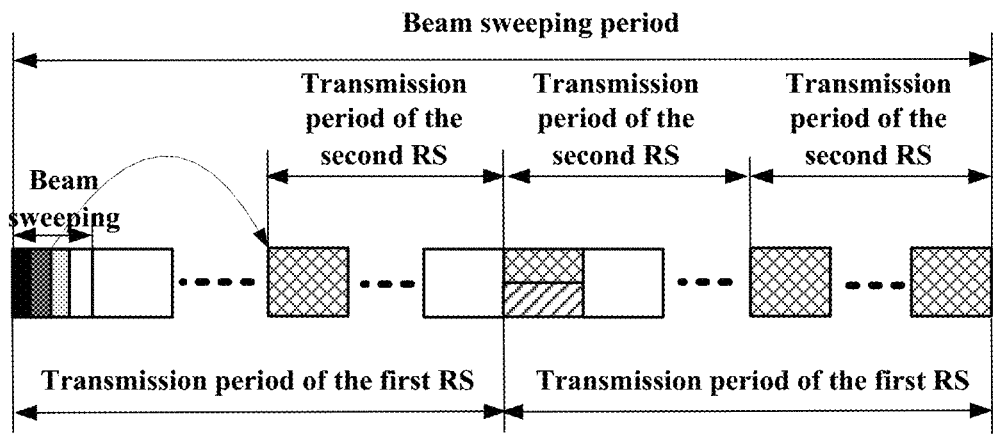
FIG. 12 is a schematic diagram of transmission periods of a first reference signal and a second reference signal of Embodiment 2 of this disclosure.

FIG. 12 is a schematic diagram of transmission periods of the first reference signal and the second reference signal of the embodiment of this disclosure. As shown in FIG. 12, the beam sweeping period, the transmission period of the first reference signal and the transmission period of the second reference signal may be all different. Where, the shadowed oblique lines show the transmission subframe of the first reference signal, and the shadowed oblique lattices show the transmission subframe of the second reference signal.

As shown in FIG. 12, the first reference signal and the second reference signal may be multiplexed. If the current subframe is the transmission subframe of both the first reference signal and the second reference signal, the two types of beam reference signals may be multiplexed in a time domain and/or frequency domain multiplexing manner. In addition, in the transmission subframe of the second reference signal, all the beam reference signals may be sequentially transmitted in different beam directions, or only one or more beam reference signals may be transmitted, and the directions of the beams may be flexibly controlled according to distributed positions of the user equipments through the above-described method for configuring a beam reference signal.

In an embodiment, the second reference signal may be transmitted by using a pseudo-random sequence, the pseudo-random sequence being initialized by using a beam identifier. For example, the second reference signal may be generated by an equation as below:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1;$$

where, $n_s$ is a slot index in a radio frame, and l is an OFDM symbol index on a slot. $c_{init}=2^{10} \cdot (7 \cdot (n_s+1)+l+1) \cdot (2 \cdot N_{ID}^{beam}+1)+2 \cdot N_{ID}^{beam}+N_{CP}$; where, $N_{ID}^{beam}$ is a beam ID, which may implicitly contain a cell ID.

That is, the pseudo-random sequence for transmitting the second reference signal may be initialized based on the beam ID, or may be initialized based on the beam ID and the cell ID. And furthermore, the pseudo-random sequence of the second reference signal may be initialized by using a channel state information (CSI) index configured by a higher layer, that is, the pseudo-random sequence for transmitting the second reference signal may be initialized based on the beam ID and/or a CSI identifier. It should be noted that only a particular implementation of the second reference signal is illustrated above; however, this disclosure is not limited thereto.

It can be seen from the above embodiments that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

Embodiment 3

These embodiments of this disclosure provide a method for transmitting a reference signal, which shall be described from a receiving device of a communication system, with contents identical to those in embodiments 1 and 2 being not going to be described herein any further.

Figure 13:
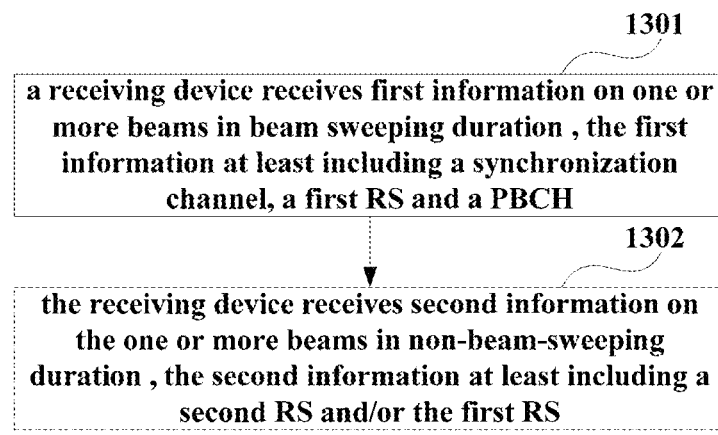
FIG. 13 is a flowchart of the method for transmitting a reference signal of Embodiment 3 of this disclosure.

FIG. 13 is a flowchart of the method for transmitting a reference signal of the embodiment of this disclosure. As shown in FIG. 13, the method for transmitting a reference signal includes:

Block 1301: a receiving device receives first information on one or more beams in beam sweeping duration, the first information at least including a synchronization channel, a first reference signal and a physical broadcast channel.

In an embodiment, the first information may further include: a control channel and/or data channel used for transmitting system parameters.

In an embodiment, the first reference signal and the physical broadcast channel may be multiplexed in frequency domain, or the first reference signal and the physical broadcast channel may be multiplexed in time domain, or the first reference signal and the physical broadcast channel may be multiplexed in frequency domain and time domain.

In an embodiment, the first reference signal and the control channel and/or data channel may be multiplexed in frequency domain, or the first reference signal and the control channel and/or data channel may be multiplexed in time domain, or the first reference signal and the control channel and/or data channel may be multiplexed in frequency domain and time domain.

As shown in FIG. 13, the method may further include:

Block 1302: the receiving device receives second information on the one or more beams in non-beam-sweeping duration, the second information at least including a second reference signal and/or the first reference signal.

In an embodiment, a transmission period of the first reference signal is identical to or different from a period of the beam sweeping, and the transmission period of the first reference signal is identical to or different from a transmission period of the second reference signal.

In an embodiment, the first reference signal and the second reference signal may be multiplexed in frequency domain, or the first reference signal and the second reference signal may be multiplexed in time domain, or the first reference signal and the second reference signal may be multiplexed in frequency domain and time domain.

In an embodiment, one or more sets of second reference signals may be configured, and configuration information of the second reference signals may be indicated by a transmitting device via signaling.

It can be seen from the above embodiments that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

Embodiment 4

These embodiments of this disclosure provide an apparatus for transmitting a reference signal, configured in a transmitting device in a communication system. These embodiments of this disclosure correspond to the methods in embodiments 1 and 2, with identical contents being not going to be described herein any further.

Figure 14:
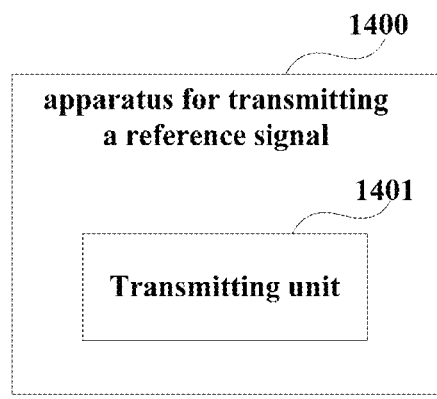
FIG. 14 is a schematic diagram of the apparatus for transmitting a reference signal of Embodiment 4 of this disclosure.

FIG. 14 is a schematic diagram of the apparatus for transmitting a reference signal of the embodiment of this disclosure. As shown in FIG. 14, the apparatus 1400 for transmitting a reference signal includes:

a transmitting unit 1401 configured to transmit first information on one or more beams formed by a plurality of antennas in beam sweeping duration, the first information at least including a synchronization channel, a first reference signal and a physical broadcast channel.

In an embodiment, the transmitting unit 1401 may further be configured to transmit second information on the one or more beams in non-beam-sweeping duration, the second information at least including a second reference signal and/or the first reference signal.

In an embodiment, the transmitting unit 1401 may perform the beam sweeping periodically, and transmit the first information sequentially in each beam in the duration of each time of beam sweeping. The transmitting unit 1401 may transmit the second information periodically. And a transmission period of the first reference signal may be identical to or different from a period of the beam sweeping, and the transmission period of the first reference signal may be identical to or different from a transmission period of the second reference signal.

The first reference signal and the physical broadcast channel may be multiplexed in frequency domain, or the first reference signal and the physical broadcast channel may be multiplexed in time domain, or the first reference signal and the physical broadcast channel may be multiplexed in frequency domain and time domain.

In an embodiment, the first reference signal in the first information may be sequentially transmitted for all or part of the beams, and pseudo random sequences used for transmitting the first reference signal may be initialized based on beam identifiers.

In an embodiment, the first information may further include: a control channel and/or data channel used for transmitting system parameters.

The first reference signal and the control channel and/or data channel may be multiplexed in frequency domain, or the first reference signal and the control channel and/or data channel may be multiplexed in time domain, or the first reference signal and the control channel and/or data channel may be multiplexed in frequency domain and time domain.

In an embodiment, the first reference signal in the second information may be transmitted for all or part of the beams, the second reference signal in the second information may be transmitted for all or part of the beams, and pseudo random sequences used for transmitting the second reference signal may be initialized based on beam identifiers and/or channel state information identifiers.

The first reference signal and the second reference signal may be multiplexed in frequency domain, or the first reference signal and the second reference signal may be multiplexed in time domain, or the first reference signal and the second reference signal may be multiplexed in frequency domain and time domain.

In an embodiment, one or more sets of the second reference signals may be configured, and configuration information on the second reference signal is indicated by the transmitting device via signaling.

It can be seen from the above embodiments that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

Embodiment 5

These embodiments of this disclosure provide an apparatus for transmitting a reference signal, configured in a receiving device in a communication system. These embodiments of this disclosure correspond to the method in Embodiment 3, with identical contents being not going to be described herein any further.

Figure 15:
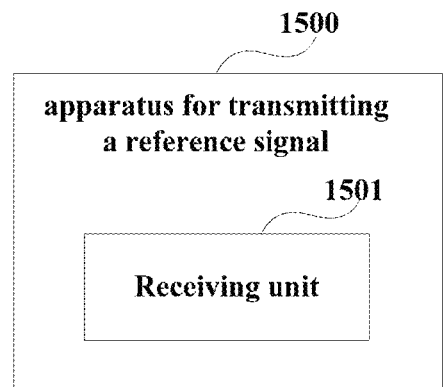
FIG. 15 is a schematic diagram of the apparatus for transmitting a reference signal of Embodiment 5 of this disclosure.

FIG. 15 is a schematic diagram of the apparatus for transmitting a reference signal of the embodiment of this disclosure. As shown in FIG. 15, the apparatus 1500 for transmitting a reference signal includes:

a receiving unit 1501 configured to receive first information on one or more beams in beam sweeping duration, the first information at least including a synchronization channel, a first reference signal and a physical broadcast channel.

In an embodiment, the receiving unit 1501 may further be configured to receive second information on the one or more beams in non-beam-sweeping duration, the second information at least including a second reference signal and/or the first reference signal.

The first reference signal and the physical broadcast channel are multiplexed in frequency domain, or the first reference signal and the physical broadcast channel are multiplexed in time domain, or the first reference signal and the physical broadcast channel are multiplexed in frequency domain and time domain.

In an embodiment, the first information may further include: a control channel and/or data channel used for transmitting system parameters.

The first reference signal and the control channel and/or data channel are multiplexed in frequency domain, or the first reference signal and the control channel and/or data channel are multiplexed in time domain, or the first reference signal and the control channel and/or data channel are multiplexed in frequency domain and time domain.

In an embodiment, a transmission period of the first reference signal may be identical to or different from a period of the beam sweeping, and the transmission period of the first reference signal may be identical to or different from a transmission period of the second reference signal.

The first reference signal and the second reference signal may be multiplexed in frequency domain, or the first reference signal and the second reference signal may be multiplexed in time domain, or the first reference signal and the second reference signal may be multiplexed in frequency domain and time domain.

In an embodiment, one or more sets of the second reference signals may be configured, and configuration information of the second reference signal is indicated by the transmitter end via signaling.

It can be seen from the above embodiments that the transmitting device transmits the first information on one or more beams formed by a plurality of antennas in beam sweeping duration, the first information at least including a synchronization channel, a first reference signal and a physical broadcast channel. Hence, the receiving device may demodulate the physical broadcast channel by using the first reference signal, thereby achieving design of beam reference signals in a beam sweeping system.

Embodiment 6

These embodiments of this disclosure provide a communication system, with contents identical to those in embodiments 1-5 being not going to be described herein any further.

In an embodiment, the communication system may include:

a transmitting device configured with the apparatus 1400 for transmitting a reference signal as described in Embodiment 4; and a receiving device configured with the apparatus 1500 for transmitting a reference signal as described in Embodiment 5.

Figure 16:
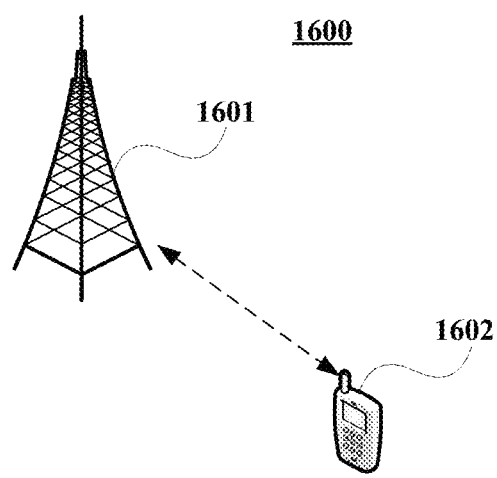
FIG. 16 is a schematic diagram of the communication system of Embodiment 6 of this disclosure.

FIG. 16 is a schematic diagram of the communication system of the embodiment of this disclosure, in which a case where the transmitting device is a base station and the receiving device is a user equipment is illustrated. As shown in FIG. 16, the communication system 1600 may include a base station 1601 and a user equipment 1602. The base station 1601 is configured with the apparatus 1400 for transmitting a reference signal as described in Embodiment 4, and the user equipment 1602 is configured with the apparatus 1500 for transmitting a reference signal as described in Embodiment 5.

The embodiment of this disclosure further provides a transmitting device, which may be, for example, a base station. However, this disclosure is not limited thereto, and it may also be other network devices. And following description shall be given by taking a base station as an example.

Figure 17:
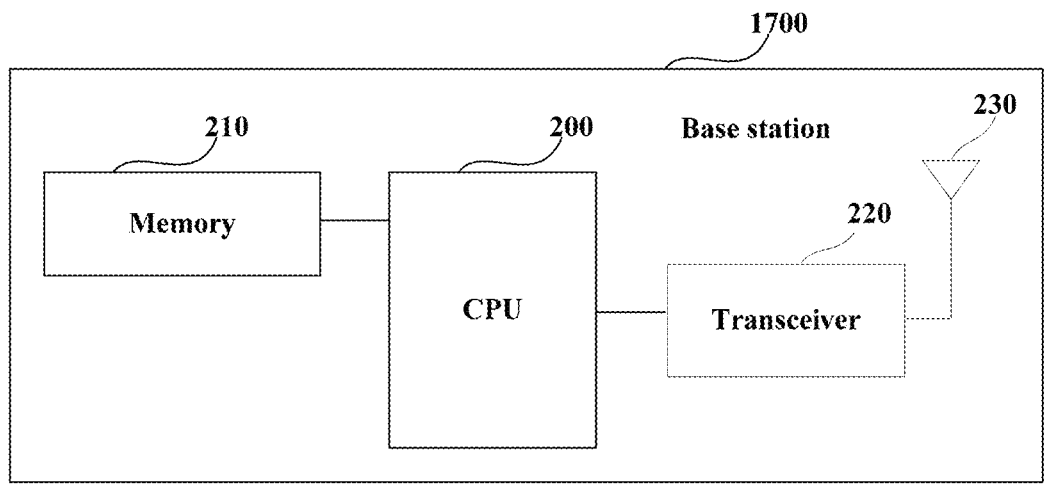
FIG. 17 is a schematic diagram of the base station of Embodiment 6 of this disclosure.

FIG. 17 is a schematic diagram of a structure of the base station of the embodiment of this disclosure. As shown in FIG. 17, the base station 1700 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The central processing unit 200 may be configured to carry out the functions of the apparatus 1400 for transmitting a reference signal.

For example, the central processing unit 200 may be configured to perform following control: transmitting first information on one or more beams formed by a plurality of antennas in beam sweeping duration, the first information at least including a synchronization channel, a first reference signal and a physical broadcast channel.

Furthermore, the central processing unit 200 may be configured to perform following control: transmitting second information on the one or more beams in non-beam-sweeping duration, the second information at least including a second reference signal and/or the first reference signal.

Furthermore, as shown in FIG. 17, the base station 1700 may include a transceiver 220, and an antenna 230, etc. Functions of the above components are similar to those in the relevant art, and shall not be described herein any further.

It should be noted that the base station 1700 does not necessarily include all the parts shown in FIG. 17, and furthermore, the base station 1700 may include parts not shown in FIG. 17, and the relevant art may be referred to.

The embodiment of this disclosure further provides receiving device, which may be, for example, a user equipment. However, this disclosure is not limited thereto, and it may also be other network devices. And following description shall be given by taking a user equipment as an example.

Figure 18:
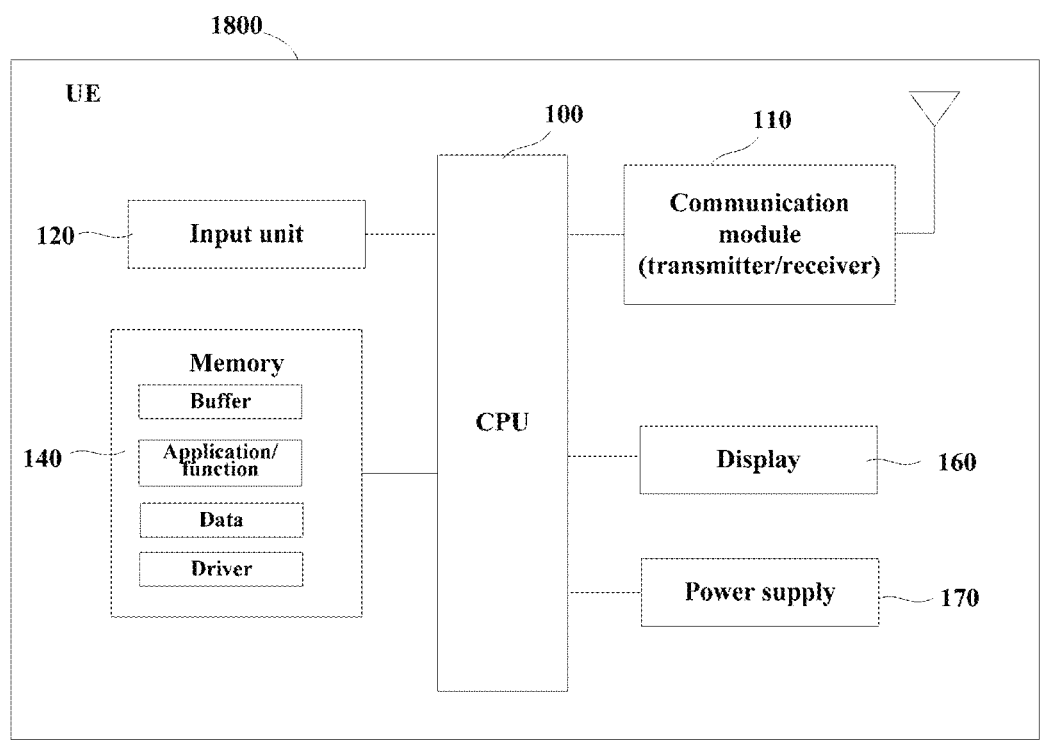
FIG. 18 is a schematic diagram of the user equipment of Embodiment 6 of this disclosure.

FIG. 18 is a schematic diagram of the user equipment of the embodiment of this disclosure. As shown in FIG. 18, the user equipment 1800 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

The central processing unit 100 may be configured to carry out the functions of the apparatus 1500 for transmitting a reference signal.

For example, the central processing unit 100 may be configured to perform following control: receiving first information on one or more beams in beam sweeping duration, the first information at least including a synchronization channel, a first reference signal and a physical broadcast channel.

Furthermore, the central processing unit 100 may be configured to perform following control: receiving second information on the one or more beams in non-beam-sweeping duration, the second information at least including a second reference signal and/or the first reference signal.

As shown in FIG. 18, the user equipment 1800 may further include a communication module 110, an input unit 120, a display 160 and a power supply 170. Functions of the above components are similar to those in the relevant art, and shall not be described herein any further. It should be noted that the user equipment 1800 does not necessarily include all the parts shown in FIG. 18, and the above components are not necessary; and furthermore, the user equipment 1800 may include parts not shown in FIG. 18, and the relevant art may be referred to.

An embodiment of the present disclosure provides a computer readable program code, which, when executed in a transmitting device, will cause the transmitting device to carry out the method for transmitting a reference signal described in Embodiment 1 or 2.

An embodiment of the present disclosure provides a storage medium, including a computer readable program code, which will cause a transmitting device to carry out the method for transmitting a reference signal described in Embodiment 1 or 2.

An embodiment of the present disclosure provides a computer readable program code, which, when executed in a receiving device, will cause the receiving device to carry out the method for transmitting a reference signal described in Embodiment 3.

An embodiment of the present disclosure provides a storage medium, including a computer readable program code, which will cause a receiving device to carry out the method for transmitting a reference signal described in Embodiment 3.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of this disclosure may be directly embodied as hardware, software modules executed by a processor, or a combination thereof. For example, one or more functional block diagrams and/or one or more combinations of the functional block diagrams shown in FIG. 14 may either correspond to software modules of procedures of a computer program, or correspond to hardware modules. Such software modules may respectively correspond to the steps shown in FIG. 6. And the hardware module, for example, may be carried out by firming the soft modules by using a field programmable gate array (FPGA).

The soft modules may be located in an RAM, a flash memory, an ROM, an EPROM, and an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. An apparatus for transmitting a reference signal, configured in a transmitting device, the apparatus comprising:
a memory that stores a plurality of instructions; and
a processor coupled to the memory and configured to execute the plurality of instructions to:
periodically transmit first information on at least one beam, the first information at least comprising a primary synchronization signal, a secondary synchronization signal, a physical broadcast channel and a first reference signal for demodulating the physical broadcast channel, and the first reference signal is frequency-multiplexed with the physical broadcast channel,
wherein the first reference signal is generated based on a beam identifier and a cell ID, and
a pseudo random sequence of the first reference signal for demodulating the physical broadcast channel is initialized based on the beam identifier and the cell ID.

2. The apparatus according to claim 1, wherein the processor is configured to perform a beam sweeping periodically, and transmit the first information sequentially on each beam in duration of each time of beam sweeping.

3. The apparatus according to claim 1, wherein when the first information is transmitted on a plurality of beams, the first reference signal in the first information is sequentially transmitted on all or part of the beams, and for pseudo random sequences of the first reference signal transmitted on different beams, each pseudo random sequence is initialized based on a beam identifier of a corresponding beam and the cell ID.

4. The apparatus according to claim 1, wherein the first information further comprises a control channel and/or data channel used for transmitting SIB1.

5. The apparatus according to claim 4, wherein on a beam that transmitted the first information, the first reference signal and the control channel and/or data channel are multiplexed in frequency domain, or the first reference signal and the control channel and/or data channel are multiplexed in time domain, or the first reference signal and the control channel and/or data channel are multiplexed in frequency domain and time domain.

6. The apparatus according to claim 1, wherein the processor is further configured to transmit second information on the at least one beam, the second information at least comprising a second reference signal and/or the first reference signal.

7. The apparatus according to claim 6, wherein when the second information is transmitted on a plurality of beams, the first reference signal in the second information is transmitted on all or part of the beams, the second reference signal in the second information is transmitted on all or part of the beams, and pseudo random sequences of the second reference signal transmitted on different beams are respectively initialized based on a beam identifier of a corresponding beam and/or a channel state information identifier configured via high-layer signaling.

8. The apparatus according to claim 6, wherein the second information is configured with only the second reference signal, and the second reference signal is identical to or different from the first reference signal.

9. The apparatus according to claim 6, wherein a transmission period of the first reference signal is identical to or different from a period of a beam sweeping, and the transmission period of the first reference signal is identical to or different from a transmission period of the second reference signal.

10. The apparatus according to claim 6, wherein on a beam that transmitted the first information, the first reference signal and the second reference signal are multiplexed in frequency domain, or the first reference signal and the second reference signal are multiplexed in time domain, or the first reference signal and the second reference signal are multiplexed in frequency domain and time domain.

11. The apparatus according to claim 6, wherein one or more sets of second reference signals are configured, and configuration information of the second reference signal is indicated by the transmitting device via signaling.

12. An apparatus for transmitting a reference signal, configured in a receiving device, the apparatus comprising:
a memory that stores a plurality of instructions; and
a processor coupled to the memory and configured to execute the plurality of instructions to:
receive first information periodically transmitted on at least one beam, the first information at least comprising a primary synchronization signal, a secondary synchronization signal, a physical broadcast channel and a first reference signal for demodulating the physical broadcast channel, and the first reference signal is frequency-multiplexed with the physical broadcast channel,
wherein the first reference signal is generated based on a beam identifier and a cell ID, and
a pseudo random sequence of the first reference signal for demodulating the physical broadcast channel is initialized based on the beam identifier and the cell ID.

13. The apparatus according to claim 12, wherein the first information further comprises: a control channel and/or data channel used for transmitting SIB1.

14. The apparatus according to claim 13, wherein on a beam that transmitted the first information, the first reference signal and the control channel and/or data channel are multiplexed in frequency domain, or the first reference signal and the control channel and/or data channel are multiplexed in time domain, or the first reference signal and the control channel and/or data channel are multiplexed in frequency domain and time domain.

15. The apparatus according to claim 12, wherein the processor is further configured to receive second information on the at least one beam, the second information at least comprising a second reference signal and/or the first reference signal.

16. The apparatus according to claim 15, wherein a transmission period of the first reference signal is identical to or different from a period of a beam sweeping, and the transmission period of the first reference signal is identical to or different from a transmission period of the second reference signal.

17. The apparatus according to claim 15, wherein on a beam that transmitted the first information, the first reference signal and the second reference signal are multiplexed in frequency domain, or the first reference signal and the second reference signal are multiplexed in time domain, or the first reference signal and the second reference signal are multiplexed in frequency domain and time domain.

18. A communication system, comprising:
a transmitting device configured to periodically transmit first information on at least one beam, the first information at least comprising a primary synchronization signal, a secondary synchronization signal, a physical broadcast channel and a first reference signal used for demodulating the physical broadcast channel, and the first reference signal is frequency-multiplexed with the physical broadcast channel,
wherein the first reference signal is generated based on a beam identifier and a cell ID, and a pseudo random sequence of the first reference signal for demodulating the physical broadcast channel is initialized based on the beam identifier and the cell ID; and
a receiving device configured to receive the first information on the at least one beam.

* * * * *